(12) United States Patent
Lisha et al.

(10) Patent No.: US 11,192,024 B1
(45) Date of Patent: Dec. 7, 2021

(54) ACCURATE END-TO-END LATENCY MEASUREMENT

(71) Applicant: Electronic Arts Inc., Redwood City, CA (US)

(72) Inventors: Shlomi Lisha, Pardes Hanna-Karkur (IL); Naaran Finkelstein, Zichron Yaakov (IL)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/839,022

(22) Filed: Apr. 2, 2020

(51) Int. Cl.
*A63F 13/35* (2014.01)
*A63F 13/215* (2014.01)

(52) U.S. Cl.
CPC ............ *A63F 13/35* (2014.09); *A63F 13/215* (2014.09)

(58) Field of Classification Search
None
See application file for complete search history.

(56) References Cited

U.S. PATENT DOCUMENTS

| 8,401,821 | B1* | 3/2013 | Sertamo | G06F 11/3419 |
| | | | | 702/182 |
| 9,268,888 | B1* | 2/2016 | Leong | G06F 13/00 |
| 9,477,241 | B2* | 10/2016 | Schultz | G05D 23/1905 |
| 10,159,053 | B2* | 12/2018 | Romera | H04L 7/02 |
| 2012/0311621 | A1* | 12/2012 | Foster | H04N 21/4383 |
| | | | | 725/14 |
| 2014/0004945 | A1* | 1/2014 | Griffin | H04N 21/43637 |
| | | | | 463/31 |
| 2020/0355743 | A1* | 11/2020 | Lim | G06F 11/00 |

* cited by examiner

*Primary Examiner* — Ronald Laneau
(74) *Attorney, Agent, or Firm* — McDermott Will & Emery LLP (57) ABSTRACT

Various aspects of the subject technology relate to systems, methods, and machine-readable media for measuring latency. The method includes receiving, at a microcontroller, a first signal from a first device at a first time. The first device may include a device under test (DUT) having a gaming system. The method also includes comparing, through the microcontroller, a timing of a second signal with the first signal. The second signal may either be sent to a second device, or received from the second device. The second signal may be either sent or received at a second time. The method also includes calculating, through the microcontroller, a latency of the first device based on a difference in the timing of the first signal and the second signal.

17 Claims, 6 Drawing Sheets

ACCURATE END-TO-END LATENCY MEASUREMENT

TECHNICAL FIELD

The present disclosure generally relates to video games, and more particularly to accurately measuring end-to-end latency.

BACKGROUND

Online gaming is a popular way of playing video games where the video games are run on remote servers and streamed directly to user devices. As improvements in game graphics and audio quality have increased video game sizes, online streaming of video games has become a viable way of allowing users to play the games without taking up local storage space. However, online gaming relies on having a reliable internet connection. As a result, issues with video game latency may negatively affect user enjoyment.

BRIEF SUMMARY

The subject disclosure provides for systems and methods of automatically and accurately measuring end-to-end latency in an online gaming environment. In an aspect, an automated analog system generates controller commands in preset intervals and measures end-to-end latency by detecting a rendering time (e.g., from button press to rendering) on a client side. The system may be configured to run several iterations and provide as an output the measured end-to-end latency. In each iteration, the system may run a special game that changes an image color from black to white in response to a button press. The microcontroller may send a signal to an actuator coupled to a gamepad. A sensor located on a display sends an electrical signal to a microcontroller whenever a color change (e.g., black to white) is sensed. The microcontroller can calculate the difference between the time of gamepad button press and rendered image change on the client's display within a millisecond accuracy. According to aspects, the system may also have another sensor connected to a speaker of the client device to measure a difference between the rendered image and a sound from the speaker. For example, the system may generate not only a change in the image but also an associated sound at the time the image has changed.

According to one embodiment of the present disclosure, a computer-implemented method for measuring latency is provided. The method includes receiving, at a microcontroller, a first signal from a first device at a first time. The first device may include a device under test (DUT) having a gaming system. The method also includes comparing, through the microcontroller, a timing of a second signal with the first signal. The second signal may either be sent to a second device, or received from the second device. The second signal may be either sent or received at a second time. The method also includes calculating, through the microcontroller, a latency of the first device based on a difference in the timing of the first signal and the second signal.

According to one embodiment of the present disclosure, a system is provided including a processor and a memory comprising instructions stored thereon, which when executed by the processor, causes the processor to perform a method for measuring latency. The method includes receiving, at a microcontroller, a first signal from a first device at a first time. The first device may include a device under test (DUT) having a gaming system. The method also includes comparing, through the microcontroller, a timing of a second signal with the first signal. The second signal may either be sent to a second device, or received from the second device. The second signal may be either sent or received at a second time. The method also includes calculating, through the microcontroller, a latency of the first device based on a difference in the timing of the first signal and the second signal.

According to one embodiment of the present disclosure, a non-transitory computer-readable storage medium is provided including instructions (e.g., stored sequences of instructions) that, when executed by a processor, cause the processor to perform a method for measuring latency. The method includes receiving, at a microcontroller, a first signal from a first device at a first time. The first device may include a device under test (DUT) having a gaming system. The method also includes comparing, through the microcontroller, a timing of a second signal with the first signal. The second signal may either be sent to a second device, or received from the second device. The second signal may be either sent or received at a second time. The method also includes calculating, through the microcontroller, a latency of the first device based on a difference in the timing of the first signal and the second signal.

According to one embodiment of the present disclosure, a system is provided that includes means for storing instructions, and means for executing the stored instructions that, when executed by the means, cause the means to perform a method for measuring latency. The method includes receiving, at a microcontroller, a first signal from a first device at a first time. The first device may include a device under test (DUT) having a gaming system. The method also includes comparing, through the microcontroller, a timing of a second signal with the first signal. The second signal may either be sent to a second device, or received from the second device. The second signal may be either sent or received at a second time. The method also includes calculating, through the microcontroller, a latency of the first device based on a difference in the timing of the first signal and the second signal.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Online gaming is a popular way of playing video games where the video games are run on remote servers and streamed directly to user devices. As improvements in game graphics and audio quality have increased video game sizes, online streaming of video games has become a viable way of allowing users to play the games without taking up local storage space. However, online gaming relies on having a reliable internet connection. As a result, issues with video game latency may negatively affect user enjoyment.

Conventional methods of measuring end-to-end latency mostly rely on high-speed cameras. However, these conventional methods are not completely accurate due to the fact that they require a manual identification of a gaming input and a corresponding image change. They also require a manual process for analyzing the video and results.

Aspects of the present disclosure address these issues by providing for systems and methods for measuring latency. The system enables an administrator to inject various network and latency conditions and measure their effect on the end-to-end latency of online gaming. This is especially important for cloud gaming systems where the end-to-end latency is composed from several factors such as round-trip-delay, packet-loss, encoding time, decoding time, etc.

The disclosed system addresses a problem in traditional video game access tied to computer technology, namely, the technical problem of accounting for end-to-end latency in online gaming. The disclosed system solves this technical problem by providing a solution also rooted in computer technology, namely, by providing for systems and methods that measure latency.

Figure 1:
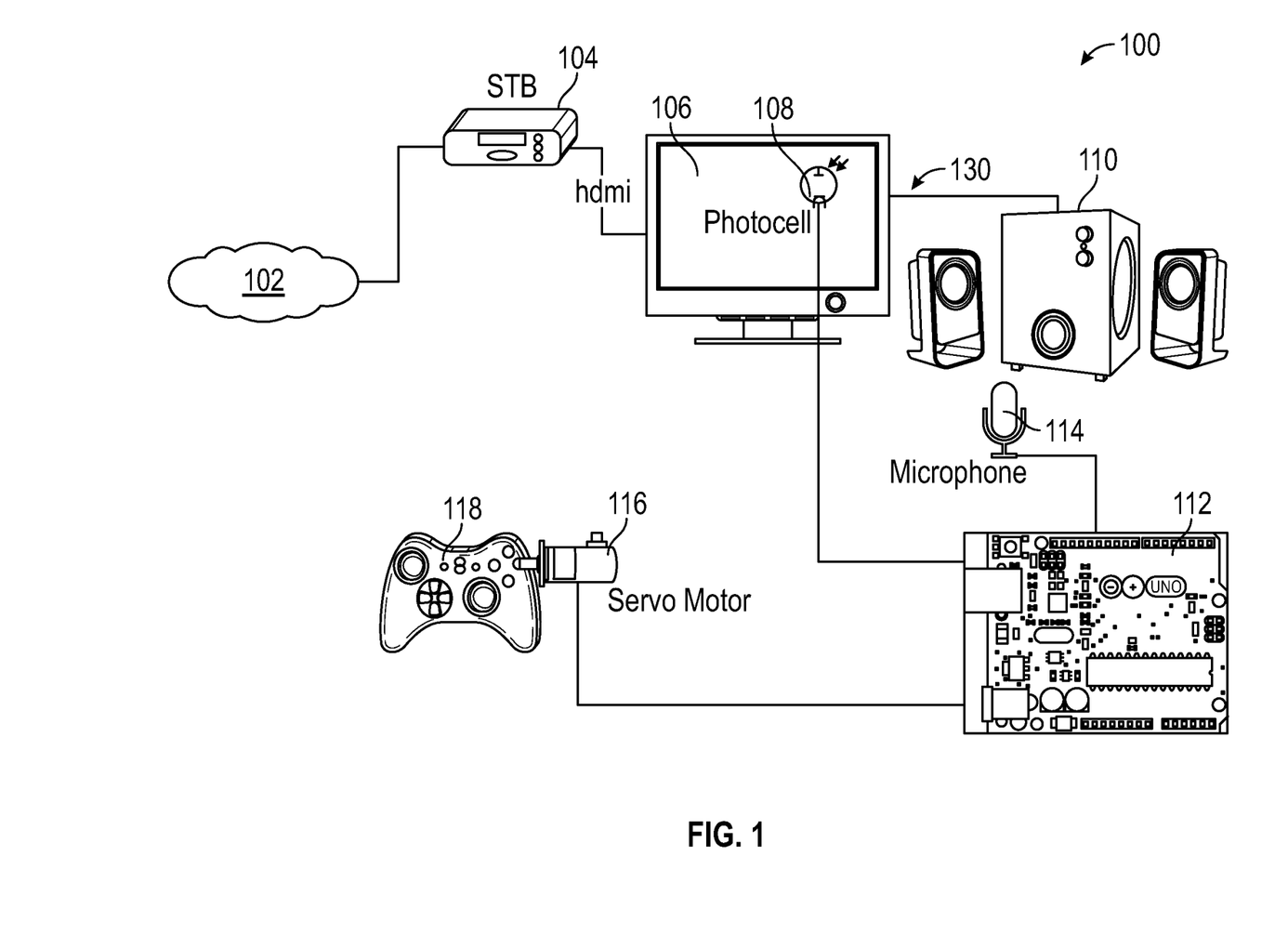
FIG. 1 illustrates an exemplary system for measuring end-to-end delay and lip synch delay, according to certain aspects of the present disclosure.

FIG. 1 illustrates an exemplary system 100 for measuring end-to-end delay and lip synch delay, according to certain aspects of the present disclosure. The system 100 may include a DUT 130. For example, the DUT 130 may include a gaming system 104 (e.g., a console, a laptop computer, a desktop computer, a tablet computer, a mobile device, a set-top box, a cloud gaming client, etc.) coupled to a display 106. For example, the gaming system 104 may be coupled to the display 106 through a High-Definition Multimedia Interface (HDMI) connection. The DUT 130 may be coupled to an audio output 110 (e.g., speakers). The gaming system 104 may be coupled to a network 102 (e.g., wireless network, internet network, cloud network, Ethernet, WiFi, 4G, 5G, etc.).

According to aspects, the system 100 may further include a microcontroller 112 that is coupled to a photocell 108. For example, the photocell 108 may be coupled to the display 106 to detect visual changes in the display 106. The microcontroller 112 may also be coupled to a microphone 114. For example, the microphone 114 may be positioned proximate to the audio output 110 to detect sounds emitted from the audio output 110. The microcontroller 112 may also be coupled to an actuator 116 configured to actuate a gamepad 118 of the gaming system 104. For example, the gamepad 118 may be coupled to the gaming system 104 to provide gamepad input into the gaming system 104. In an implementation, the actuator 116 may include a servo motor that presses buttons of the gamepad 118 for providing the gamepad input.

According to aspects, the gaming system 104 may receive (e.g., stream) an online game through an internet network (e.g., via an integrated client of the game system 104). For example, the online game may be a game that is designed to test a latency of the system 100. In an implementation, pressing a button of the gamepad 118 may cause a video output to the display 106 to alternately change from white to black and black to white. For example, if the display 106 is white, pressing a button of the gamepad 118 would cause the display 106 to turn black, and vice versa. According to aspects, the game may also emit a sound with each change in the color of the display 106. For example, if the display is black, pressing a button of the gamepad 118 would cause the display 106 to turn white and emit a sound through the audio output 110, and vice versa.

Because the gaming system 104 is streaming the game from the internet network (e.g., network 102), there is an expected latency in the system 100. In order to accurately measure the latency of the system 100, the microcontroller 112 may be configured to send a signal to the actuator 116 that causes the actuator 116 to actuate the gamepad 118. The microcontroller 112 may then detect, through the photocell 108, how long it takes for the display 106 to change colors. Because the microcontroller 112 knows at what time (e.g., time T1) the signal was sent to the actuator 116 to actuate the gamepad 118, and the microcontroller 112 also knows at what time (e.g., time T2) a change in the display 106 was detected by the photocell 108, the microcontroller 112 may determine the latency in the system 100 by calculating a difference in T1 and T2. Similarly, an audio delay may be determined based on what time (e.g., T3) the audio signal was detected by the microphone 114 from the audio output 110. As a result, the audio delay may be determined by calculating a difference between T1 and T3. A lip synch delay may be measured by calculating a difference between T2 and T3.

According to aspects, the signal from the microcontroller 112 to the actuator 116 may cause the actuator 116 to actuate the gamepad 118 in various ways. For example, the signal may cause the actuator 116 to actuate the gamepad 118 repeatedly at set intervals, at random intervals, at offset intervals, quickly (e.g., less than one second between button presses), slowly (over one second between button presses), etc. The actuator 116 may also be configured to actuate all control elements (e.g., joystick(s), trigger(s), button(s), directional pad(s), etc.) of the gamepad 118 in various combinations at various intervals. According to further aspects, the microcontroller 112 may be configured to send multiple signals to the actuator 116, such that each signal causes a single actuation of a single control element of the gamepad 118. As such, the microcontroller 112 keeps track of a time of each signal sent in order to calculate the delay as described above. In another implementation, the signal sent from the microcontroller 112 may be a single signal that causes multiple actuations of the gamepad 118 (e.g., a combination of button presses and joystick movements, etc.). As such, the microcontroller 112 would be configured to calculate the latency based on a difference between when the signal was sent and when changes in the display 106 are detected by the photocell 108.

Based on results of the testing by the microcontroller 112, the latency of the system 100 may be determined. According to aspects, if the latency is within a predefined threshold (e.g., less than 50 ms, less than 30 ms, etc.), then the system 100 may be determined to have a satisfactory latency. If the latency is unsatisfactory, then an administrator may adjust settings of a client (e.g., an operating system (OS), an application installed on the gaming system 104) until the desired latency is achieved. The DUT OS may also be switched/improved. According to aspects, the system 100 may run several iterations and output the measured latency for each iteration. In this way, the latency of the system 100 may be accounted for and optimized in order to achieve improved user enjoyment while playing an online game.

According to aspects, settings of the system 100 may be adjusted to mimic real life network traffic conditions. For example, the system 100 may enable an administrator to inject various network and latency conditions and measure their effect on the end-to-end latency. As a result, end-to-end latency caused by several factors such as round-trip-delay, packet-loss, encoding time, decoding time, etc., may be tested for and addressed.

Figure 2:
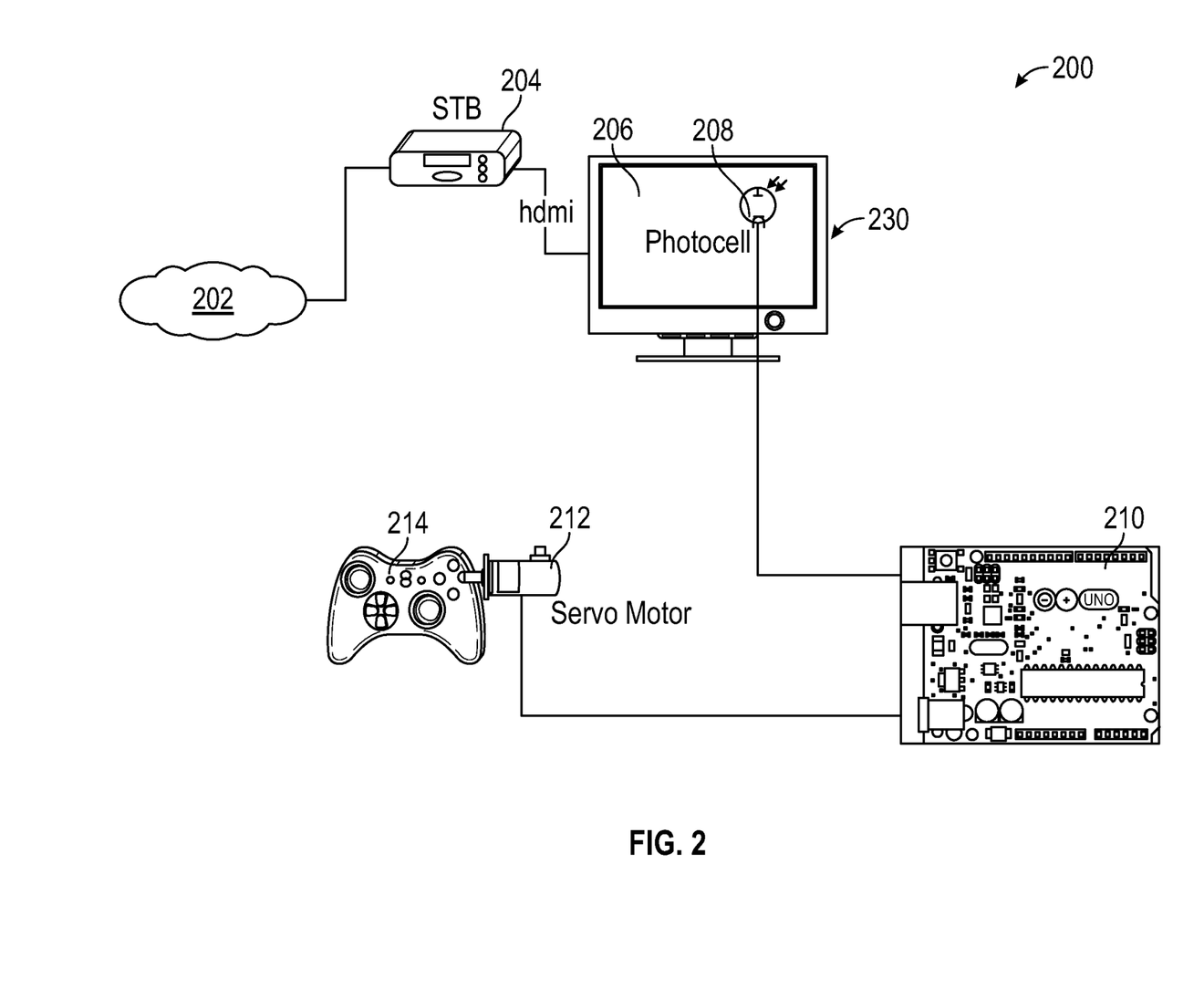
FIG. 2 illustrates another exemplary system for measuring end-to-end delay, according to certain aspects of the present disclosure.

FIG. 2 illustrates another exemplary system 200 for measuring end-to-end delay, according to certain aspects of the present disclosure. The system 200 may include a DUT 230 including a gaming system 204 coupled to a display 206. For example, the gaming system 204 may be coupled to the display 206 through a High-Definition Multimedia Interface (HDMI) connection. The gaming system 204 may be coupled to a network 202 (e.g., wireless network, internet network, cloud network, Ethernet, WiFi, 4G, 5G, etc.).

According to aspects, the system 200 may further include a microcontroller 210 that is coupled to a photocell 208. For example, the photocell 208 may be coupled to the display 206 to detect visual changes in the display 206. The microcontroller 210 may also be coupled to an actuator 212 configured to actuate a gamepad 214 of the gaming system 204. For example, the gamepad 214 may be coupled to the gaming system 204 to provide gamepad input into the gaming system 204. In an implementation, the actuator 212 may include a servo motor that presses buttons of the gamepad 214 for providing the gamepad input.

According to aspects, the gaming system 204 may receive an online game through the internet network 202 (e.g., fiber optic, asymmetric digital subscriber line (ADSL), WiFi, 4G, 5G, etc.). For example, the online game may be a game that is designed to test a latency of the system 200. In an implementation, pressing a button of the gamepad 214 may cause a video output to the display 206 to alternately change from white to black and black to white. For example, if the display 206 is white, pressing a button of the gamepad 214 would cause the display 206 to turn black, and vice versa.

Similar to the above in FIG. 1, because the gaming system 204 is streaming the game from the wireless network 202, there is an expected latency in the system 200. In order to accurately measure the latency of the system 200, the microcontroller 210 may be configured to send a signal to the actuator 212 that causes the actuator 212 to actuate the gamepad 214. The microcontroller 210 may then detect, through the photocell 208, how long it takes for the display 206 to change colors. Because the microcontroller 210 knows at what time (e.g., time T1) the signal was sent to the actuator 212 to actuate the gamepad 214, and the microcontroller 210 also knows at what time (e.g., time T2) a change in the display 206 was detected by the photocell 208, the microcontroller 210 may determine the latency in the system 200 by calculating a difference in T1 and T2.

Similar to the above in FIG. 1, the signal from the microcontroller 210 to the actuator 212 may cause the actuator 212 to actuate the gamepad 214 in various ways. For example, the signal may cause the actuator 212 to actuate the gamepad 214 repeatedly at set intervals, at random intervals, at offset intervals, quickly (e.g., less than one second between button presses), slowly (over one second between button presses), etc. The actuator 212 may also be configured to actuate all control elements (e.g., joystick (s), trigger(s), button(s), directional pad(s), etc.) of the gamepad 214 in various combinations at various intervals. According to further aspects, the microcontroller 210 may be configured to send multiple signals to the actuator 212, such that each signal causes a single actuation of a single control element of the gamepad 214. As such, the microcontroller 210 keeps track of a time of each signal sent in order to calculate the delay as described above. In another implementation, the signal sent from the microcontroller 210 may be a single signal that causes multiple actuations of the gamepad 214 (e.g., a combination of button presses and joystick movements, etc.). As such, the microcontroller 210 would be configured to calculate the latency based on a difference between when the signal was sent and when changes in the display 206 are detected by the photocell 208.

Based on results of the testing by the microcontroller 210, the latency of the system 200 may be determined. According to aspects, if the latency is within a predefined threshold (e.g., less than 50 ms, less than 30 ms, etc.), then the system 200 may be determined to have a satisfactory latency. If the latency is unsatisfactory, then an administrator may adjust settings of a client (e.g., OS, an application installed on the gaming system 204) until the desired latency is achieved. According to aspects, the system 200 may run several iterations and output the measured latency for each iteration. In this way, the latency of the system 200 may be accounted for and optimized in order to achieve improved user enjoyment while playing an online game.

According to aspects, settings of the system 200 may be adjusted to mimic real life network traffic conditions. For example, the system 200 may enable an administrator to inject various network and latency conditions and measure their effect on the end-to-end latency. As a result, end-to-end latency caused by several factors such as round-trip-delay, packet-loss, encoding time, decoding time, etc., may be tested for and addressed.

Figure 3:
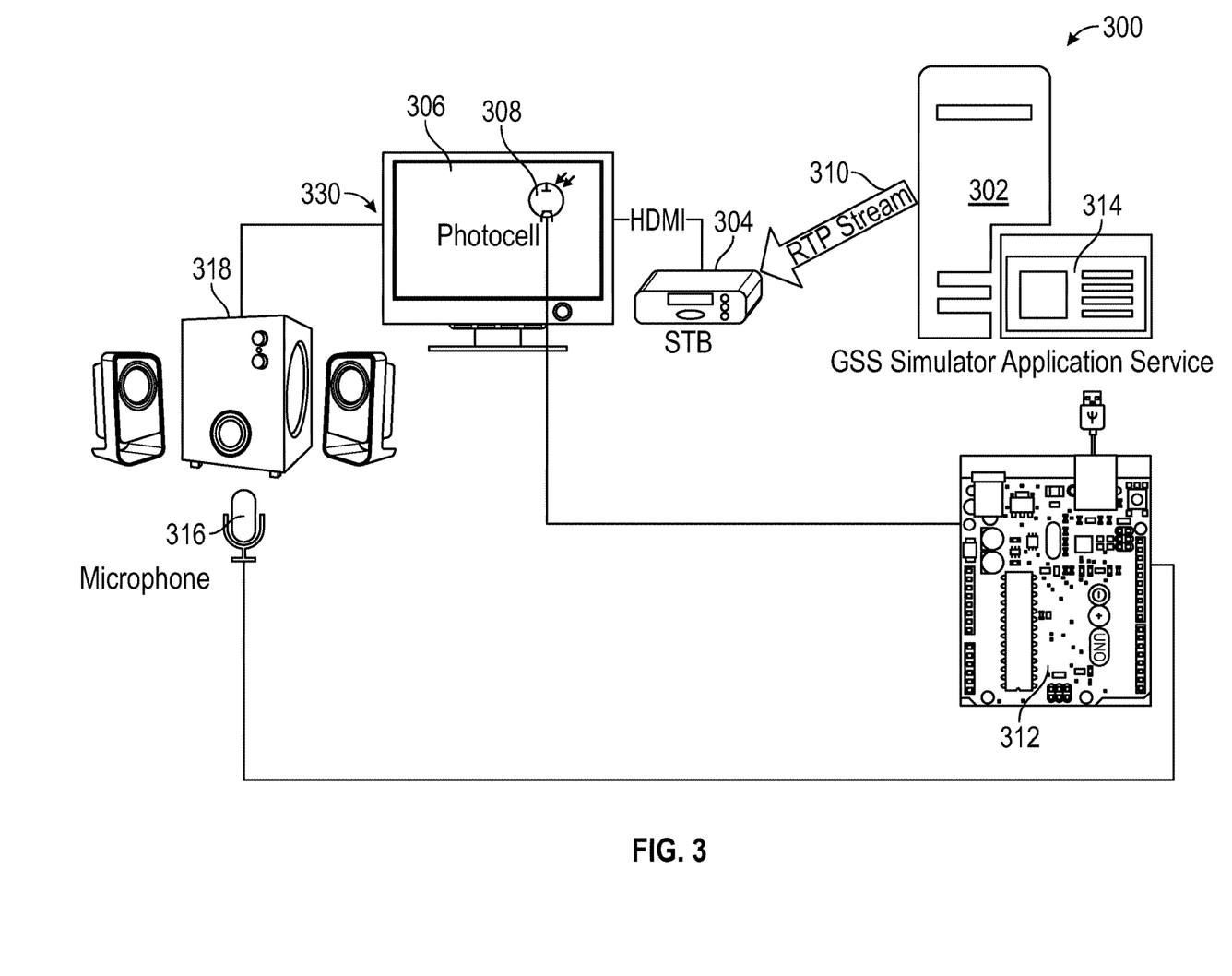
FIG. 3 illustrates an exemplary system for measuring lip sync delay, according to certain aspects of the present disclosure.

FIG. 3 illustrates an exemplary system 300 for measuring lip sync delay, according to certain aspects of the present disclosure. The system 300 may include a DUT 330 including a display 306 coupled to a gaming system 304 (e.g., via an HDMI connection, or otherwise). The DUT 330 may further include an audio output 318 coupled to the display 306. For example, the audio output 318 may include speakers coupled to the display 306 (e.g., integrated with the display 306, as a separate sound system, or otherwise).

The system 300 may further include a microcontroller 312 coupled to a photocell 308 (e.g., a light sensor) and a microphone 316 (e.g., a sound sensor). Similar to the above in FIG. 1, the photocell 308 may be coupled to the display 306 to detect visual changes in the display 306. For example, the photocell 308 may be configured to send an electrical signal to the microcontroller 312 whenever a color change (e.g., black to white, or vice versa) is sensed. Additionally, the microphone 316 may be positioned proximate to the audio output 318 to detect sounds emitted from the audio output 318. For example, the microphone 316 may be configured to send an electrical signal to the microcontroller 312 whenever an associated sound with each color change is sensed (e.g., the sound being above a defined threshold).

According to aspects, the gaming system 304 may be configured to receive a simulated input 310 that is generated by an application 314 of a simulator 302. For example, the simulated input 310 may be delivered to the gaming system 304 via a Real-Time Transport Protocol (RTP) stream. The simulated input 310 may include a pre-captured RTP stream that causes the display 306 to change. For example, the pre-captured RTP stream may be for the simple game as described above in FIGS. 1 and 2 that causes the display 306 to alternately change from white to black and black to white, along with an emitted sound corresponding to each color change. In this way, a simulated online data stream may be provided to the gaming system 304 in a controlled manner to determine a latency of the system 300.

According to aspects, the microcontroller 312 may be configured to detect a lip sync delay by comparing a difference in time between detection of a change in the display 306 through the photocell 308 and detection of the sound from the audio output 318 through the microphone 316. For example, the microcontroller 312 may calculate (e.g., within a millisecond of accuracy) a difference between a time of a rendered image change on the display 306 and the emitted sound on the speakers 318.

According to aspects, the system 300 may be configured to run several iterations and provide a measured lip sync delay as an output for each iteration. For example, in each iteration, the simulator 302 may run a pre-captured stream of a special game that changes the image color from black to white and make an associated sound at the time the image changes as a simulated response of gamepad actuation. An administrator may make adjustments to the gaming system 304 (e.g., OS, a client installed on the gaming system 304) based on the measured lip sync delays until the lip sync delay is within a defined threshold (e.g., such that it is not visibly detectable, less than 50 ms, less than 30 ms, etc.).

According to aspects, the simulated input 310 may be adjusted to simulate various network conditions, such as round-trip-delay, packet-loss, encoding time, decoding time, etc. In this way, the system 300 may be fine-tuned to account for various network conditions to determine how lip synch delay is affected.

Figure 4:
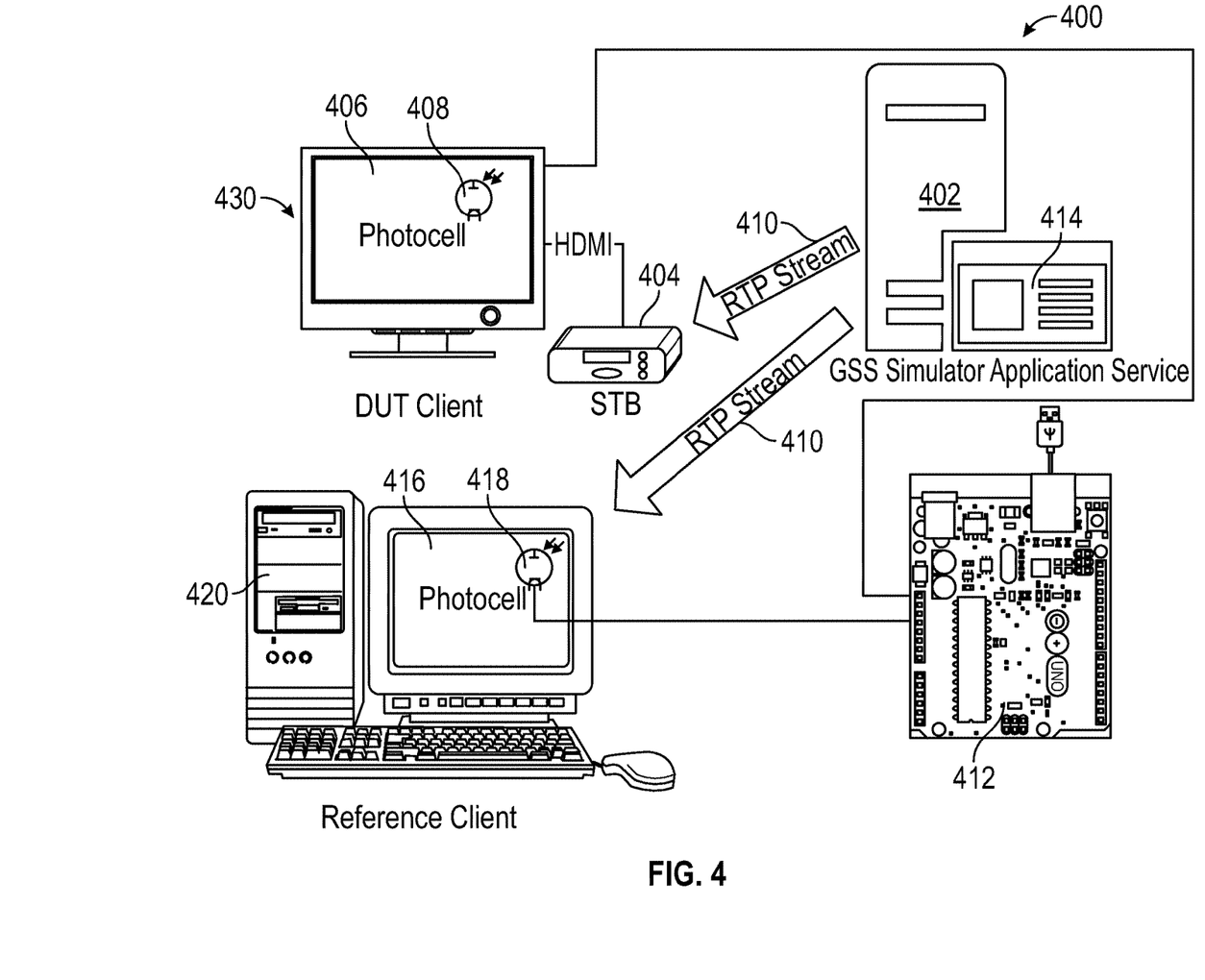
FIG. 4 illustrates an exemplary system for measuring device latency, according to certain aspects of the present disclosure.

FIG. 4 illustrates an exemplary system 400 for measuring device latency, according to certain aspects of the present disclosure. The system 400 may include a DUT 430 including a first display 406 coupled to a gaming system 404 (e.g., via an HDMI connection, or otherwise).

The system 400 may further include a microcontroller 412 coupled to a first photocell 408 (e.g., a first light sensor) and a second photocell 418 (e.g., a second light sensor). For example, the first photocell 408 may be coupled to the first display 406 to detect visual changes in the first display 406. The second photocell 418 may be coupled to a second display 416 of a reference client 420 to detect visual changes in the second display 416. For example, each photocell 408, 418 may be configured to send an electrical signal to the microcontroller 412 whenever a color change (e.g., black to white, or vice versa) is sensed.

According to aspects, the gaming system 404 may be configured to receive a simulated input 410 that is generated by an application 414 of a simulator 402. For example, the simulated input 410 may be delivered to the gaming system 404 via an RTP stream. The simulated input 410 may include a pre-captured RTP stream that causes the display 406 to change. For example, the pre-captured RTP stream may be for the simple game as described above in FIGS. 1 and 2 that causes the display 406 to alternately change from white to black and black to white. In this way, a simulated online data stream may be provided to the gaming system 404 in a controlled manner to determine a latency of the system 400.

According to aspects, the reference client 420 may simultaneously receive the same simulated input 410. Furthermore, the reference client 420 may include a known latency. For example, the known latency may be determined by the systems and methods as described above in FIGS. 1-3. Therefore, the microcontroller 412 may utilize the known latency of the reference client 420 to calculate a device latency of the DUT 430.

According to aspects, the system 400 may be configured to run several iterations and provide a measured device latency for the DUT 430 as an output for each iteration. For example, in each iteration, the simulator 402 may run a pre-captured stream of a special game that changes the image color from black to white as a simulated response of gamepad actuation. An administrator may make adjustments to the gaming system 404 (e.g., OS, a client installed on the gaming system 404) based on the measured device latency until the device latency is within a defined threshold (e.g., less than 50 ms, less than 30 ms, etc.).

According to aspects, the simulated input 410 may be adjusted to simulate various network conditions, such as round-trip-delay, packet-loss, encoding time, decoding time, etc. In this way, the system 400 may be fine-tuned to account for various network conditions to improve player experience.

Figure 5:
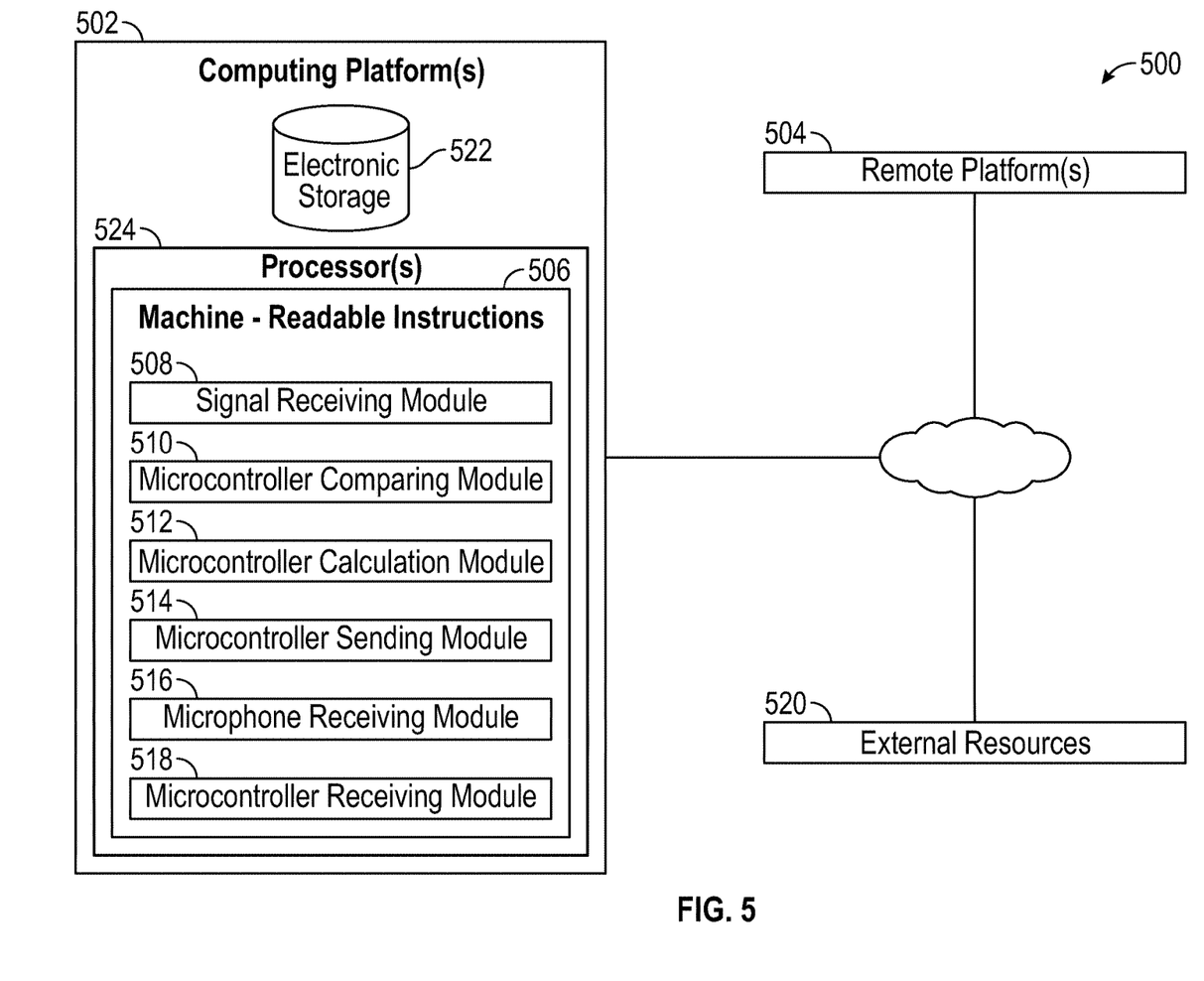
FIG. 5 illustrates a system configured for measuring latency, in accordance with one or more implementations

FIG. 5 illustrates a system 500 configured for measuring latency, according to certain aspects of the disclosure. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/ or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of signal receiving module 508, microcontroller comparing module 510, microcontroller calculation module 512, microcontroller sending module 514, microphone receiving module 516, microcontroller receiving module 518, and/or other instruction modules.

Signal receiving module 508 may be configured to receive, at a microcontroller, a first signal from a first device at a first time. The first device may include a device under test (DUT) including a gaming system. The first signal may include a pre-captured video stream that causes a detectable change in a display of the gaming system. The first signal may be received through a photocell coupled to a display of the gaming system.

Microcontroller comparing module 510 may be configured to compare, through the microcontroller, a timing of a second signal with the first signal. The microcontroller configured to either send the second signal to a second device or receive the second signal from the second device. The second device may include an actuator. The second device may include a microphone. The second device may include a reference client having a known latency.

Microcontroller calculation module 512 may be configured to calculate, through the microcontroller, a latency of the first device based on a difference in the timing of the first signal and the second signal.

Microcontroller sending module 514 may be configured to send, through the microcontroller, the second signal to the actuator at the second time. The second time may occur before the first time. The actuator may be configured to actuate a gamepad of the gaming system such that the gamepad may cause a detectable change in a display of the gaming system. The photocell may be configured to relay a change in the display of the gaming system to the microcontroller.

Microphone receiving module 516 may be configured to receive, through the microphone, an audio signal from a speaker of the DUT. The audio signal may be caused by the first signal.

Microcontroller receiving module 518 may be configured to receive, through the microcontroller, the second signal from the reference client. The reference client may be configured to receive a pre-captured video stream that may cause a detectable change in a display of the reference client. The first signal may include the pre-captured video stream. The pre-captured video stream may cause a detectable change in a display of the gaming system.

In some implementations, computing platform(s) 502, remote platform(s) 504, and/or external resources 520 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 520 may be operatively linked via some other communication media.

A given remote platform 504 may include one or more processors configured to execute computer program modules. The computer program modules may be configured to enable an expert or user associated with the given remote platform 504 to interface with system 500 and/or external resources 520, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 520 may include sources of information outside of system 500, external entities participating with system 500, and/or other resources. In some implementations, some or all of the functionality attributed herein to external resources 520 may be provided by resources included in system 500.

Computing platform(s) 502 may include electronic storage 522, one or more processors 524, and/or other components. Computing platform(s) 502 may include communication lines or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 522 may comprise non-transitory storage media that electronically store information. The electronic storage media of electronic storage 522 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 522 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 522 may include one or more virtual storage resources (e.g., cloud storage, a virtual private network, and/or other virtual storage resources). Electronic storage 522 may store software algorithms, information determined by processor(s) 524, information received from computing platform(s) 502, information received from remote platform(s) 504, and/or other information that enables computing platform(s) 502 to function as described herein.

Processor(s) 524 may be configured to provide information processing capabilities in computing platform(s) 502. As such, processor(s) 524 may include one or more of a digital processor, an analog processor, a digital circuit designed to process information, an analog circuit designed to process information, a state machine, and/or other mechanisms for electronically processing information. Although processor(s) 524 is shown in FIG. 5 as a single entity, this is for illustrative purposes only. In some implementations, processor(s) 524 may include a plurality of processing units. These processing units may be physically located within the same device, or processor(s) 524 may represent processing functionality of a plurality of devices operating in coordination. Processor(s) 524 may be configured to execute modules 508, 510, 512, 514, 516, and/or 518, and/or other modules. Processor(s) 524 may be configured to execute modules 508, 510, 512, 514, 516, and/or 518, and/or other modules by software; hardware; firmware; some combination of software, hardware, and/or firmware; and/or other mechanisms for configuring processing capabilities on processor(s) 524. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, and/or 518 are illustrated in FIG. 5 as being implemented within a single processing unit, in implementations in which processor(s) 524 includes multiple processing units, one or more of modules 508, 510, 512, 514, 516, and/or 518 may be implemented remotely from the other modules. The description of the functionality provided by the different modules 508, 510, 512, 514, 516, and/or 518 described below is for illustrative purposes, and is not intended to be limiting, as any of modules 508, 510, 512, 514, 516, and/or 518 may provide more or less functionality than is described. For example, one or more of modules 508, 510, 512, 514, 516, and/or 518 may be eliminated, and some or all of its functionality may be provided by other ones of modules 508, 510, 512, 514, 516, and/or 518. As another example, processor(s) 524 may be configured to execute one or more additional modules that may perform some or all of the functionality attributed below to one of modules 508, 510, 512, 514, 516, and/or 518.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
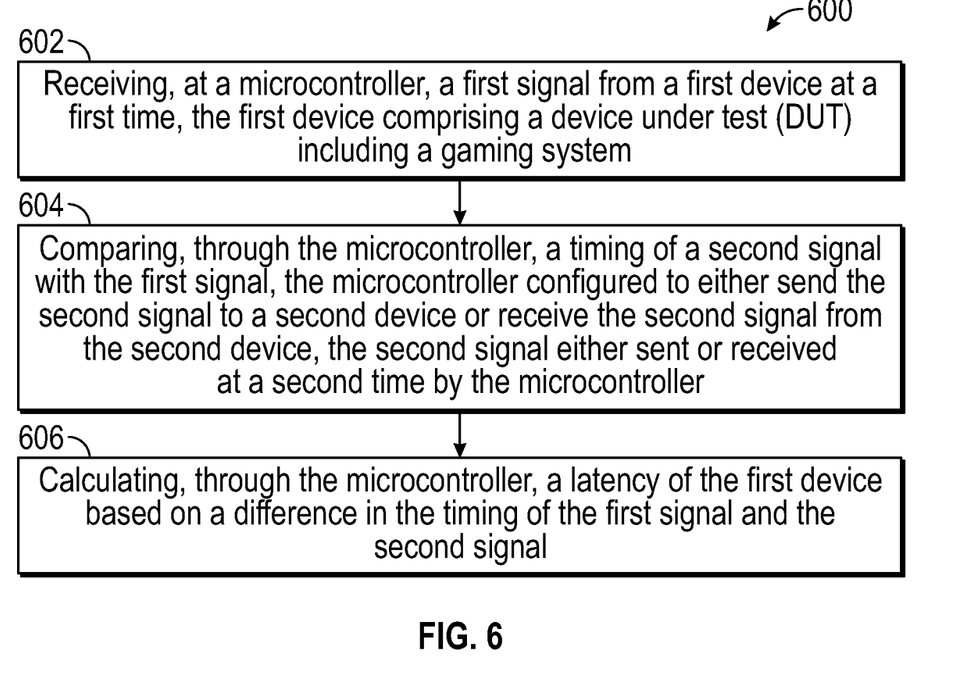
FIG. 6 illustrates an example flow diagram for measuring latency, according to certain aspects of the disclosure.

FIG. 6 illustrates an example flow diagram (e.g., process 600) for measuring latency, according to certain aspects of the disclosure. For explanatory purposes, the example process 600 is described herein with reference to FIGS. 1-4. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-4.

At step 602, a microcontroller receives a first signal from a first device at a first time. The first device may include a device under test (DUT) including a gaming system. At step 604 the microcontroller compares a timing of a second signal with the first signal. The microcontroller may be configured to either send the second signal to a second device or receive the second signal from the second device. The second signal may be either sent or received at a second time by the microcontroller. At step 606, the microcontroller calculates a latency of the first device based on a difference in the timing of the first signal and the second signal.

For example, as described above in relation to FIGS. 1-4, at step 602, a microcontroller (e.g., microcontrollers 112, 210, 312, and 412) receives a first signal (e.g., an electrical signal via light sensors 108, 208, 308, and 408) from a first device (e.g., the DUTs 130, 230, 330, and 430) at a first time. The first device may include a DUT including a gaming system (e.g., gaming systems 104, 204, 304, and 404). At step 604 the microcontroller compares a timing of a second signal (e.g., an electrical signal sent to actuators 116, 212 or an electrical signal received from sound sensors 114, 316 or a second light sensor 418) with the first signal. For example, the microcontroller may be configured to either send the second signal to a second device (e.g., actuators 116, 212) or receive the second signal from the second device (e.g., sound sensors 114, 316 or a second light sensor 418). The second signal may be either sent or received at a second time by the microcontroller. At step 606, the microcontroller calculates a latency of the first device based on a difference in the timing of the first signal and the second signal (e.g., a difference between the first time and the second time).

According to an aspect the second device includes an actuator, and the process 600 may further include sending, through the microcontroller, the second signal to the actuator at the second time, the second time occurring before the first time, the actuator configured to actuate a gamepad of the gaming system such that the gamepad causes a detectable change in a display of the gaming system.

According to an aspect the second device includes a microphone, and the process 600 may further include receiving, through the microphone, an audio signal from a speaker of the DUT, the audio signal caused by the first signal. In an implementation, the first signal may include a pre-captured video stream that causes a detectable change in a display of the gaming system.

According to an aspect the second device includes a reference client having a known latency, and the process 600 may further include receiving, through the microcontroller, the second signal from the reference client, the reference client configured to receive a pre-captured video stream that causes a detectable change in a display of the reference client. In an implementation, the first signal may include the pre-captured video stream, the pre-captured video stream causing a detectable change in a display of the gaming system.

According to an aspect, the first signal is received through a photocell coupled to a display of the gaming system, the photocell configured to detect a change in the display of the gaming system.

According to aspects, the systems 100, 200, 300, and 400 of FIGS. 1-4 may be configured to run several iterations and output latencies for each iteration. For example, each iteration may output a calculated latency for that iteration. The systems 100, 200, 300, and 400 may run the iterations until the latency is within a threshold, at which time the iterations end. According to aspects, iterations may range from less than 50 to more than 5,000 depending on system settings (e.g., device, FWv, SDKv, model, OS, network type, device class, CPU, GPU, etc.). Furthermore, once the iterations have ended, the microcontrollers 112, 210, 312, and 412 may be configured to calculate and output accumulated statistics including, but not limited to, average latency, a standard deviation, a minimum latency, a maximum latency, number of iterations (e.g., samples), parsing date, etc. According to aspects, the iterations may end once a satisfactory statistic is achieved. For example, once any one, or combination of, the accumulated statistics are within a threshold, the iterations may end.

Figure 7:
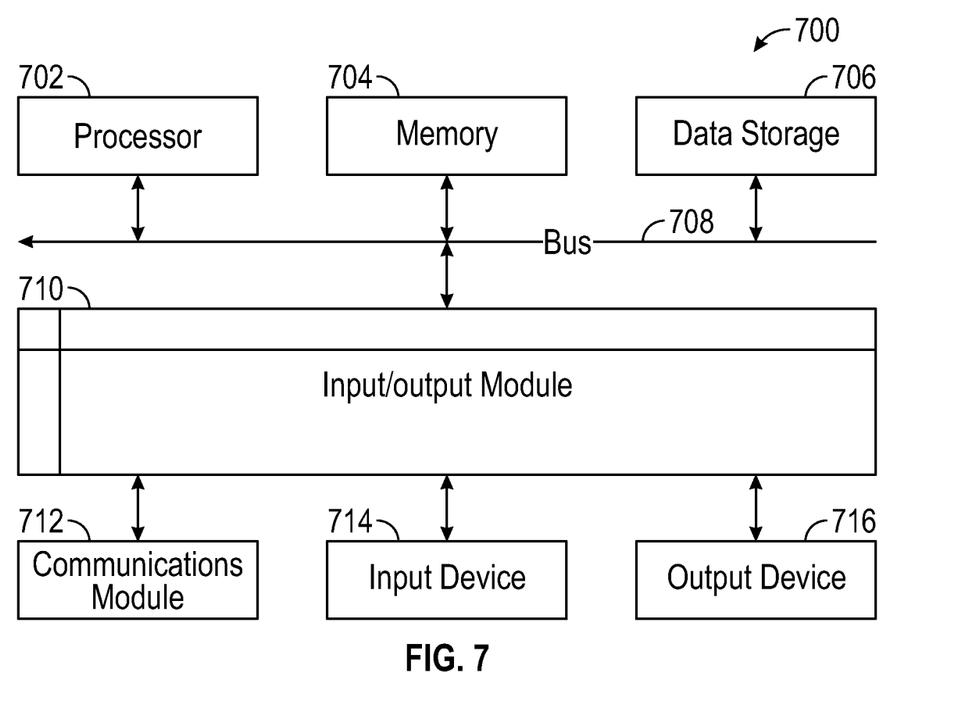
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for measuring latency, comprising:

receiving, at a microcontroller, a first signal from a first device at a first time, the first device comprising a device under test (DUT) including a gaming system;

comparing, through the microcontroller, a timing of a second signal with the first signal, the second signal either being sent to a second device or received from the second device, the second signal either being sent or received at a second time, wherein the second device comprises an actuator;

sending, through the microcontroller, the second signal to the actuator at the second time, the second time occurring before the first time, the actuator being configured to actuate a gamepad of the gaming system such that the gamepad causes a detectable change in a display of the gaming system;

calculating, through the microcontroller, a latency of the first device based on a difference in the timing of the first signal and the second signal; and causing output of the latency by the microcontroller.

2. The computer-implemented method of claim 1, wherein the second device comprises a microphone, the method further comprising:

receiving, through the microphone, an audio signal from a speaker of the DUT, the audio signal being caused by the first signal.

3. The computer-implemented method of claim 2, wherein the first signal comprises a pre-captured video stream that causes a detectable change in the display of the gaming system.

4. The computer-implemented method of claim 1, wherein the second device comprises a reference client having a known latency, the method further comprising:

receiving, through the microcontroller, the second signal from the reference client, the reference client being configured to receive a pre-captured video stream that causes a detectable change in a display of the reference client.

5. The computer-implemented method of claim 4, wherein the first signal comprises the pre-captured video stream, the pre-captured video stream causing a detectable change in the display of the gaming system.

6. The computer-implemented method of claim 1, wherein the first signal is received through a photocell coupled to the display of the gaming system, the photocell being configured to detect a change in the display of the gaming system.

7. A system for measuring latency, comprising:
a processor; and
a memory comprising instructions stored thereon, which when executed by the processor, cause the processor to perform:
receiving, at a microcontroller, a first signal from a first device at a first time, the first device comprising a device under test (DUT) including a gaming system;
comparing, through the microcontroller, a timing of a second signal with the first signal, the second signal either being sent to a second device or received from the second device, the second signal either being sent or received at a second time,
wherein the second device comprises an actuator;
sending, through the microcontroller, the second signal to the actuator at the second time, the second time occurring before the first time, the actuator being configured to actuate a gamepad of the gaming system such that the gamepad causes a detectable change in a display of the gaming system;
calculating, through the microcontroller, a latency of the first device based on a difference in the timing of the first signal and the second signal; and
causing output of the latency by the microcontroller.

8. The system of claim 7, wherein the second device comprises a microphone; and
further comprising stored sequences of instructions, which when executed by the processor, cause the processor to perform:
receiving, through the microphone, an audio signal from a speaker of the DUT, the audio signal being caused by the first signal.

9. The system of claim 8, wherein the first signal comprises a pre-captured video stream that causes a detectable change in the display of the gaming system.

10. The system of claim 7, wherein the second device comprises a reference client having a known latency; and
further comprising stored sequences of instructions, which when executed by the processor, cause the processor to perform:
receiving, through the microcontroller, the second signal from the reference client, the reference client being configured to receive a pre-captured video stream that causes a detectable change in a display of the reference client.

11. The system of claim 10, wherein the first signal comprises the pre-captured video stream, the pre-captured video stream causing a detectable change in the display of the gaming system.

12. The system of claim 7, wherein the first signal is received through a photocell coupled to the display of the gaming system, the photocell being configured to detect a change in the display of the gaming system.

13. A non-transitory computer-readable storage medium comprising instructions stored thereon, which when executed by one or more processors, cause the one or more processors to perform operations for measuring latency, the operations comprising:
receiving, at a microcontroller, a first signal from a first device at a first time, the first device comprising a device under test (DUT) including a gaming system;
comparing, through the microcontroller, a timing of a second signal with the first signal, the second signal either being sent to a second device or received from the second device, the second signal either being sent or received at a second time, wherein the second device comprises an actuator;
sending, through the microcontroller, the second signal to the actuator at the second time, the second time occurring before the first time, the actuator being configured to actuate a gamepad of the gaming system such that the gamepad causes a detectable change in a display of the gaming system;
calculating, through the microcontroller, a latency of the first device based on a difference in the timing of the first signal and the second signal; and
causing output of the latency by the microcontroller.

14. The non-transitory computer-readable storage medium of claim 13, wherein the second device comprises a microphone; and
comprising further instructions which, when executed by the one or more processors, cause the one or more processors to perform operations comprising:
receiving, through the microphone, an audio signal from a speaker of the DUT, the audio signal being caused by the first signal.

15. The non-transitory computer-readable storage medium of claim 14, comprising further instructions which, when executed by the one or more processors, cause the one or more processors to perform operations,
wherein the first signal comprises a pre-captured video stream that causes a detectable change in the display of the gaming system.

16. The non-transitory computer-readable storage medium of claim 13, wherein the second device comprises a reference client having a known latency; and
comprising further instructions which, when executed by the one or more processors, cause the one or more processors to perform operations comprising:
receiving, through the microcontroller, the second signal from the reference client, the reference client being configured to receive a pre-captured video stream that causes a detectable change in a display of the reference client.

17. The non-transitory computer-readable storage medium of claim 16, comprising further instructions which, when executed by the one or more processors, cause the one or more processors to perform operations,
wherein the first signal is received through a photocell coupled to the display of the gaming system, the photocell being configured to detect a change in the display of the gaming system.

* * * * *